United States Patent
Pallas et al.

(10) Patent No.: US 10,110,457 B2
(45) Date of Patent: Oct. 23, 2018

(54) PERFORMANCE CHARACTERIZATION BY AVAILABLE CAPACITY

(71) Applicant: Cisco Technology, Inc., San Jose, CA (US)

(72) Inventors: Derrick Lyndon Pallas, San Francisco, CA (US); Raluca Musaloiu-Elefteri, San Francisco, CA (US); Nebojsa Milosavljevic, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 192 days.

(21) Appl. No.: 14/869,780

(22) Filed: Sep. 29, 2015

(65) Prior Publication Data

US 2016/0380863 A1    Dec. 29, 2016

Related U.S. Application Data

(60) Provisional application No. 62/186,349, filed on Jun. 29, 2015.

(51) Int. Cl.
*H04L 12/26* (2006.01)
*H04L 12/24* (2006.01)

(52) U.S. Cl.
CPC ...... *H04L 43/0882* (2013.01); *H04L 41/5067* (2013.01); *H04L 43/0894* (2013.01)

(58) Field of Classification Search
CPC ............ H04L 43/0876; H04L 43/0882; H04L 41/0896
See application file for complete search history.

(56) References Cited

U.S. PATENT DOCUMENTS

| | | | | |
|---|---|---|---|---|
| 2014/0095706 A1* | 4/2014 | Raleigh | ............... | H04L 41/0893 709/224 |
| 2014/0181300 A1* | 6/2014 | Fadell | ................... | H04M 15/00 709/224 |
| 2015/0244645 A1* | 8/2015 | Lindo | ................... | H04L 47/823 709/224 |

* cited by examiner

*Primary Examiner* — Shukri Taha

(74) *Attorney, Agent, or Firm* — Fernando & Partners, LLP

(57) ABSTRACT

Previously available network monitoring and management systems fail to provide systems or processes that adequately communicate individual client experiences with regards to bitrates or communicate these experiences with respect to time, space and individual client service expectations. By contrast, and to that end, various implementations disclosed herein include systems, methods and apparatuses that obtain network utilization information from a compliant access point, wherein the network utilization information includes a respective first service level indicator value for at least one of one or more client devices; and determines a respective first performance characterization value for the at least one of the one or more client devices based on a function of the respective first service level indicator value and at least one of a first access point capacity value and a respective first network resource capacity value for the at least one of the one or more client devices.

18 Claims, 14 Drawing Sheets

| Bitrate | Successful Frame | Unsuccessful |
|---|---|---|
| $br_1$ | 7 | 10 |
| $br_2$ | 114 | 21 |
| $br_3$ | 12 | 1 |
| ... | ... | ... |
| $br_n$ | 8 | 0 |

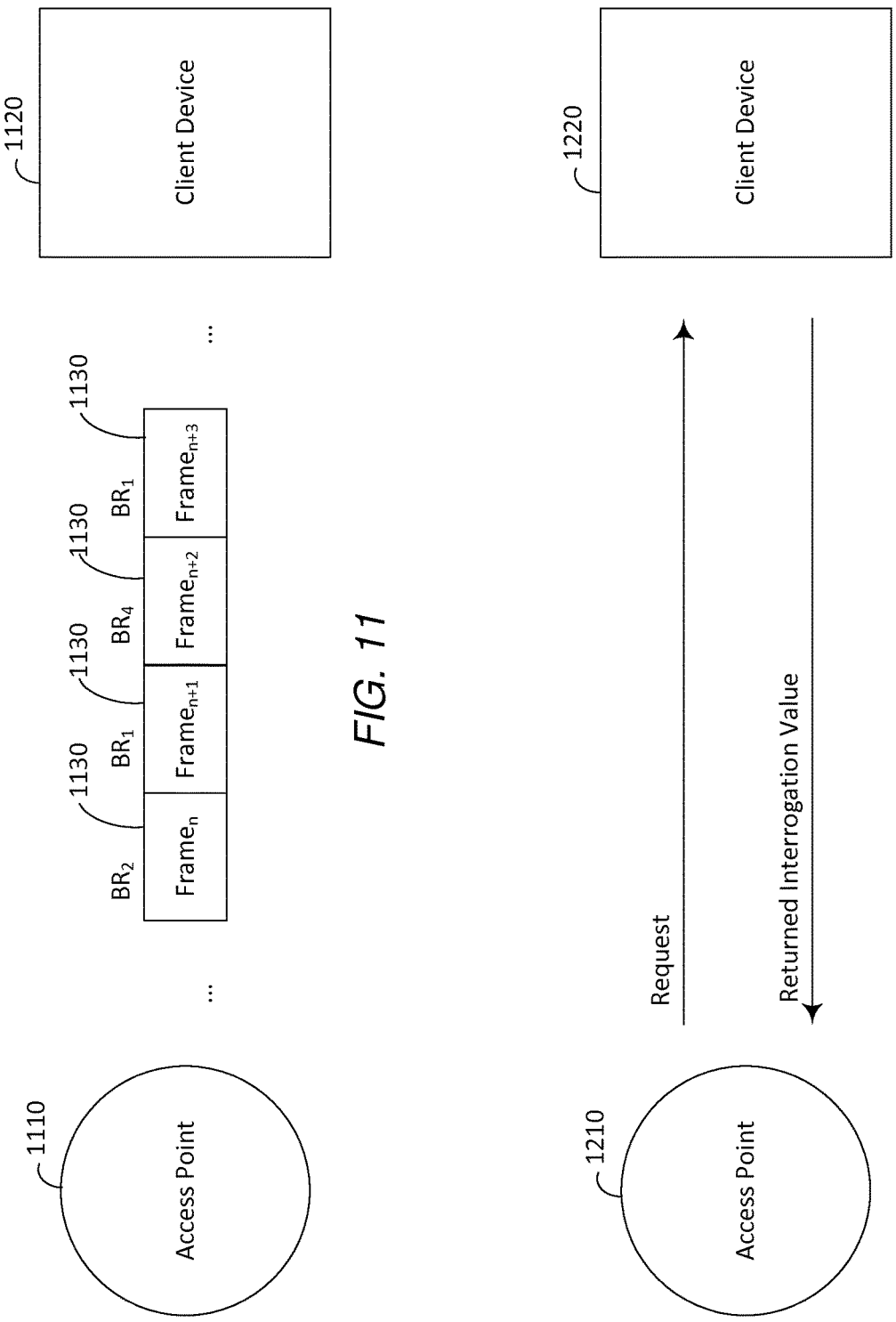

PERFORMANCE CHARACTERIZATION BY AVAILABLE CAPACITY

RELATED APPLICATIONS

This application claims the benefit of U.S. Provisional Patent Application No. 62/186,349, entitled "Performance Characterization by Available Capacity," filed on Jun. 29, 2015, and which is incorporated by reference herein.

TECHNICAL FIELD

The present disclosure relates to data networks, and in particular, to network management of a network resource based on client device capacity and resource availability.

BACKGROUND

A typical goal of the ongoing development of data networks involves improving user experience, which is often a function of the amount bandwidth that can be allocated to competing client devices. Network connectivity problems, where there is a loss of connection, or a slow or latent connection, negatively impact the user experience. In ad hoc wireless networks, such as IEEE 802.11 WiFi, bandwidth (or channel access) is dynamically shared among a number of client devices. Competition between devices complicates management of network resources, such as bandwidth. Additionally, the liberty with which a client device may join a network and move throughout the network coverage area also complicates network management. With regard to network planning, it is generally not possible to determine beforehand the volume of traffic and the geographical distribution of that traffic throughout the network coverage area. As users with mobile devices use the freedom associated with wireless connectivity to move throughout the network coverage area, traffic and congestion patterns fluctuate based on the actual usage of space within the network coverage area.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 11 is a block diagram of a client device and access point associated with methods of providing a network capacity value in accordance with some implementations.

FIG. 12 is a block diagram of a client device and access point associated with methods of providing a network capacity value in accordance with some implementations.

Figure 1:
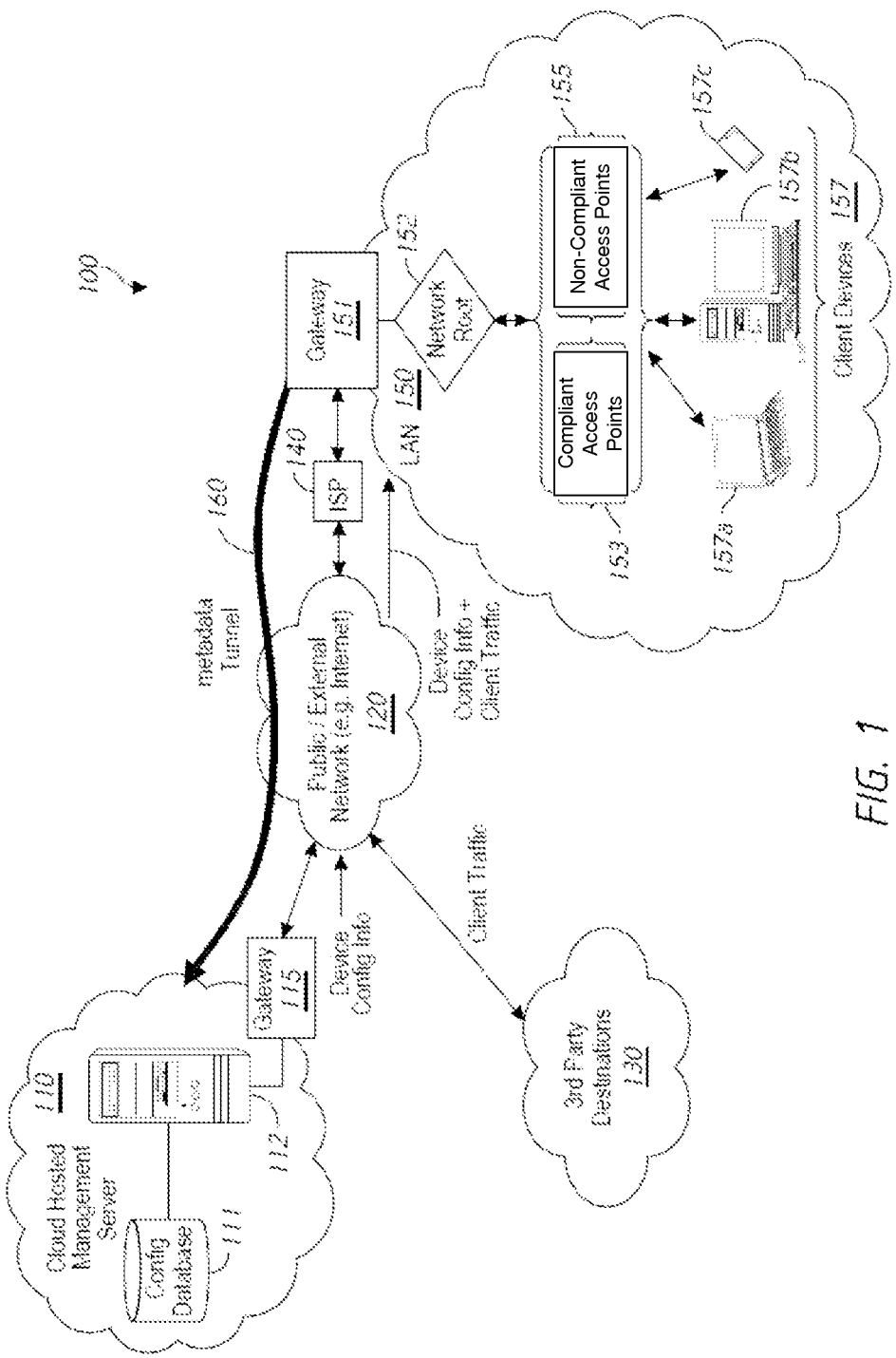
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

Previously available network monitoring and management systems fail to provide systems or processes that adequately characterize individual client device performance metrics with regards to network and/or client device resources or characterize these client device performance metrics as a function of time, space and/or individual service level expectations. By contrast, various implementations disclosed herein include systems, methods and apparatuses that obtains network utilization information from a compliant access point, wherein the network utilization information includes a respective first service level indicator value for at least one of one or more client devices; and determines a respective first performance characterization value for the at least one of the one or more client devices based on a function of the respective first service level indicator value and at least one of a first access point capacity (or capability) value and a respective first network resource capacity (or capability) value for the at least one of the one or more client devices.

Some implementations disclosed herein include systems, methods and apparatuses that obtain network utilization information from a plurality of compliant access points, wherein the network utilization information includes a respective client device identifier for each of one or more client devices from which the compliant access point receives a corresponding signal in breach of a threshold level, a respective first service level indicator value for each of the at least one or more client devices, and a respective first client device capability value for each of the at least one or more client devices, wherein each respective first client device capability value characterizes the capacity (or capability) of a respective client device to use a first network resource provided through the compliant access point; determine a respective first performance characterization value for each of the one or more client devices based on a function of the respective first service level indicator value and the respective first client device capability value; determine a respective spatial characterization value for each of the one or more client devices using said network utilization information reported from the plurality of compliant access points; and, generate a respective first space-performance tuple for each of the one or more client devices using said respective first performance characterization value and said respective spatial characterization value.

FIG. 1 is a block diagram of a data networking environment 100a in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100a includes a public/external network 120 (e.g., a portion of the Internet), one or more third-party destinations 130 (e.g., providing various third-party content and services), a cloud hosted network management system 110, an optional Internet service provider (ISP) node 140 and a local area network (LAN) 150.

The one or more third-party destinations 130 provide various third-party content and services, such as email, media content, online banking, social networking servers, etc. Other than providing sources and/or destinations for client data traffic, the details of the one or more third-party destinations 130 are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant access points 153, a number of non-compliant access points 155, and a number of client devices 157. The gateway device 151 connects the LAN 150 to the public network 120 through the optional ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical placeholder within the LAN 150. In such instances, the root node 152 merely provides a convenient LAN node that is separate from the gateway node 151. In some implementations, the root node 152 is an actual physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157a, workstation 157b, smartphone 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant access points 153 and the non-compliant access points 155 is based at least on how uplink metadata is processed by each. A non-compliant device erroneously forwards uplink metadata received from one compliant device to another, even though the non-compliant device correctly routes externally addressed traffic received from the compliant devices. That is, while a non-compliant device correctly routes externally addressed traffic towards the gateway node 151, the non-compliant device also incorrectly handles uplink metadata because it is not configured to recognize and process uplink metadata properly. By contrast, a compliant device in the hypothetical place of a non-compliant device is configured to recognize uplink metadata as information it should use and not forward from one compliant device to another device. However, in response to a request to do so, compliant devices report their own uplink metadata (e.g., such as LLDP frames) to a requesting device. To that end, in accordance with some implementations, a metadata tunnel 160 is established from the gateway node 151 of the LAN 150 to the gateway node 115 of the cloud hosted network management system 110.

The cloud hosted network management system 110 is configured to manage the configuration and operation of compliant devices in a LAN and/or across geographically distributed portions of a VLAN. To that end, the cloud hosted network management system 110 includes a configuration database 111, a cloud hosted management server 112, and a gateway device 115. The gateway device 115 connects the cloud hosted management server 112 to the public network 120 so that the cloud hosted management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

In some implementations, the ISP node 140 is provided to link the LAN 150 to the public network 120. Similar to the gateway devices 115,151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 2A:
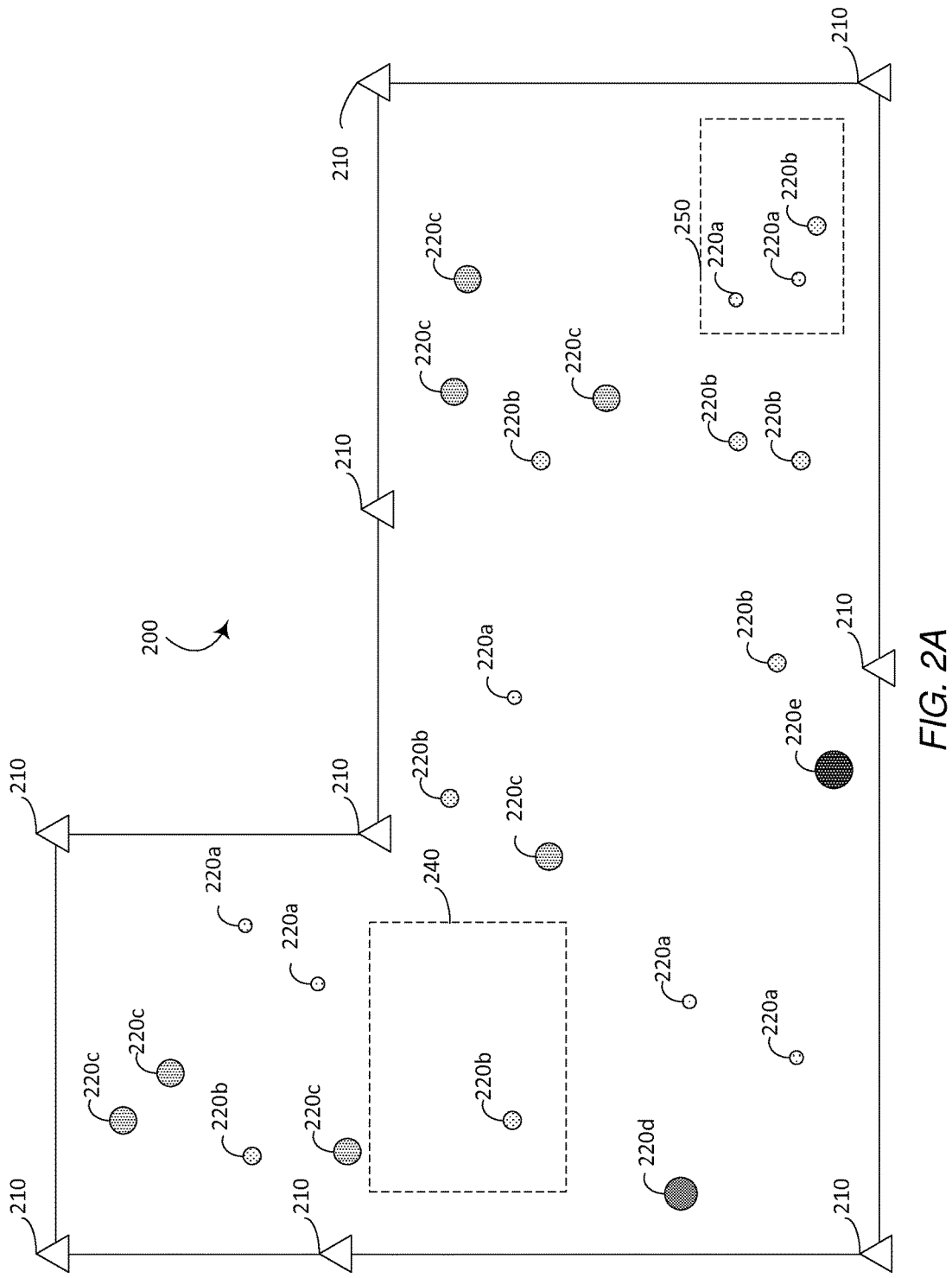
FIG. 2A is a performance diagram super-imposed on a plan view of an office layout in accordance with some implementations.

FIG. 2A is a performance diagram super-imposed on a plan view of an office layout 200 in accordance with some implementations. For additional clarity and detail, the layout 200 is described with reference to FIG. 1. In order for client devices, corresponding to client devices 157 of FIG. 1, to connect to a data networking environment corresponding to data networking environment 100a of FIG. 1, access points 210 are provided. As an example, the access points 210 correspond to the compliant access points 153 and non-compliant access points 155 of FIG. 1. According to some implementations at least one access point 210 must be a compliant access point 153. According to some implementations, at least two access points 210 must be compliant access points 153. According to some implementations, the access points 210 are at known locations. In FIG. 2A, for each client device present in the office layout 200, a raw measure of network utilization by each of a plurality of client devices is represented by metrics 220a, 220b, 220c, 220d and 220e. The metrics 220a, 220b, 220c, 220d and 220e respectively represent quintiles of raw network utilization from smallest or weakest performing ($1^{st}$) quintile to largest or strongest performing ($5^{th}$) quintile in increasing magnitude. The choice of quintile is for illustration purposes only. According to some implementations, a raw measure of network utilization is made in reference to a network connection between an individual client device 157 and an associated access point 210. According to some implementations, where access points 210 in combination provide an ad hoc data networking environment, a raw measure of network utilization is made in reference to a network connection between an individual client device 157 and an associated access point 210 that provides a performance characterization bound (e.g., a performance peak that can be achieved based on the configuration of an access point and/or client device). According to some implementations, performance characterization bound is a function of individual client device 157 performance. According to some implementations, a performance characterization bound is a function of a network resource (e.g., bandwidth) provided by an access point 210. In furtherance of the example, FIG. 2A illustrates two areas. The first is a meeting area 240, for personnel associated with the client devices. The second is a testing area 250 provided to test compliant access point 210. According to some implementations the metrics 220a, 220b, 220c, 220d and 220e are the bitrates associated with frames that are successfully transmitted between client devices 157 and an access point 210.

Figure 2B:
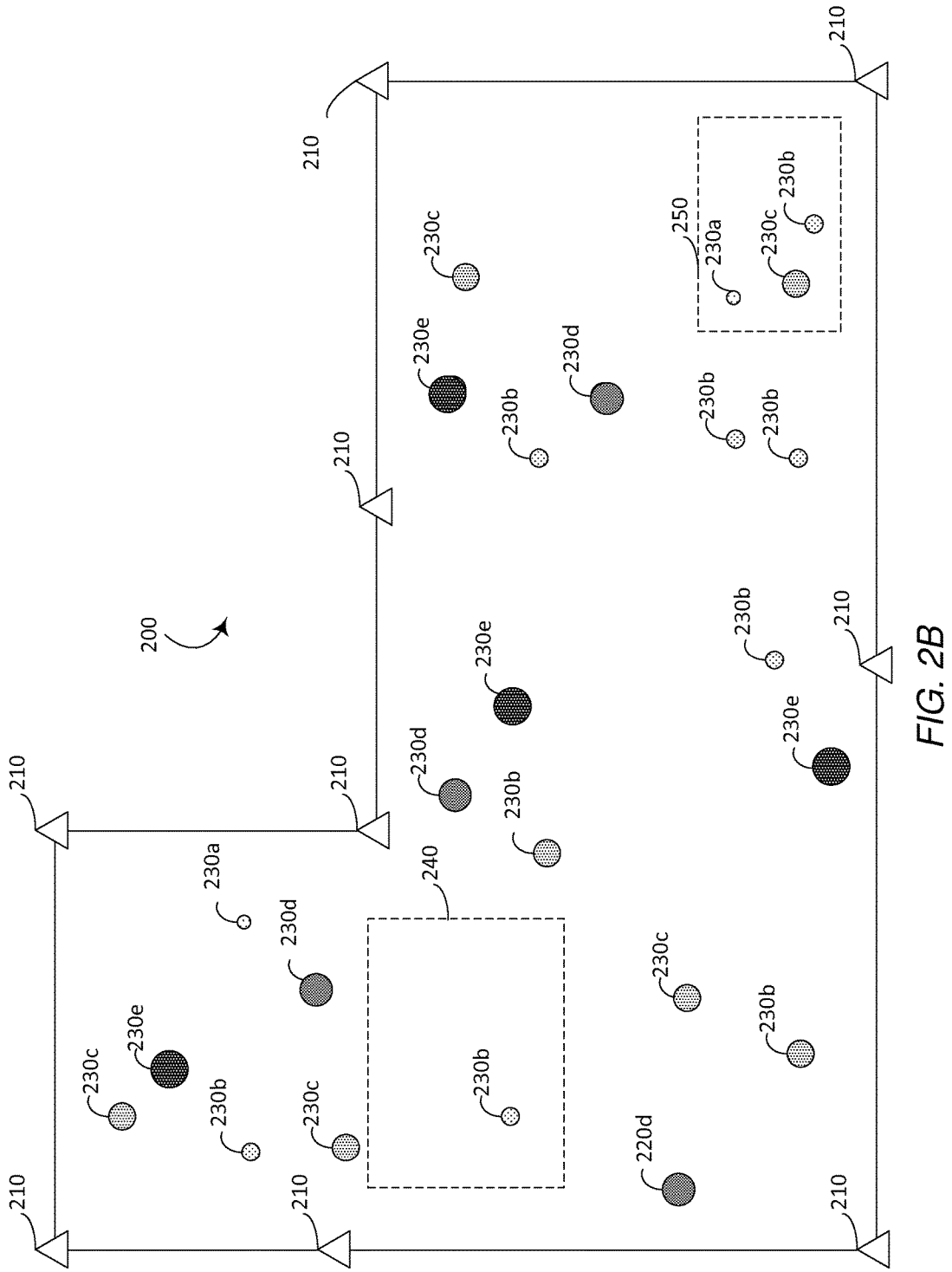
FIG. 2B is a performance diagram super-imposed on a plan view of an office layout in accordance with some implementations.

FIG. 2B is a continuation of the performance example including the office layout 200 of FIG. 2A, with corresponding access points 210, the meeting area 240 and the testing area 250. To that end, in FIG. 2B for each client device present in the office layout 200, a relative measure of network utilization is represented by metrics 230a, 230b, 230c, 230d and 230e. The metrics 230a, 230b, 230c, 230d and 230e respectively represent quintiles of relative network utilization from smallest ($1^{st}$) quintile to largest ($5^{th}$) quintile in increasing magnitude. The choice of quintile is for illustration purposes only. According to some implementations, the metrics 230a, 230b, 230c, 230d and 230e are relative metrics based on a function of a raw measure of network utilization and a capacity corresponding to the access point by which the network is utilized. According to some implementations of the present invention, the metrics 230a, 230b, 230c, 230d and 230e are relative metrics based on a function of a raw measure of network utilization and a network resource capacity of the relevant particular client device 157. In some implementations, the metrics 230a, 230b, 230c, 230d and 230e are relative metrics based on a function of a raw measure of network utilization, and the lesser of a network resource capacity of the relevant particular client device 157 and a capacity corresponding to the access point by which the network is utilized. It will be appreciated from a comparison of FIGS. 2A and 2B, that raw performance may diverge significantly from relative performance, as a client device 157 having a low raw measure of network resource utilization may have exhausted the capacity of the client device 157 to use a network resource (e.g., bandwidth) and/or the capacity provided by the access point 210 to the client device 157. Similarly, it will also be appreciated from a comparison of FIGS. 2A and 2B, that raw performance may also diverge significantly from relative performance, as a client device 157 having a high raw measure of network resource utilization may have yet to exhaust the capacity of the client device 157 and/or the capacity corresponding to the access point 210 provided to the client device 157.

Figure 2C:
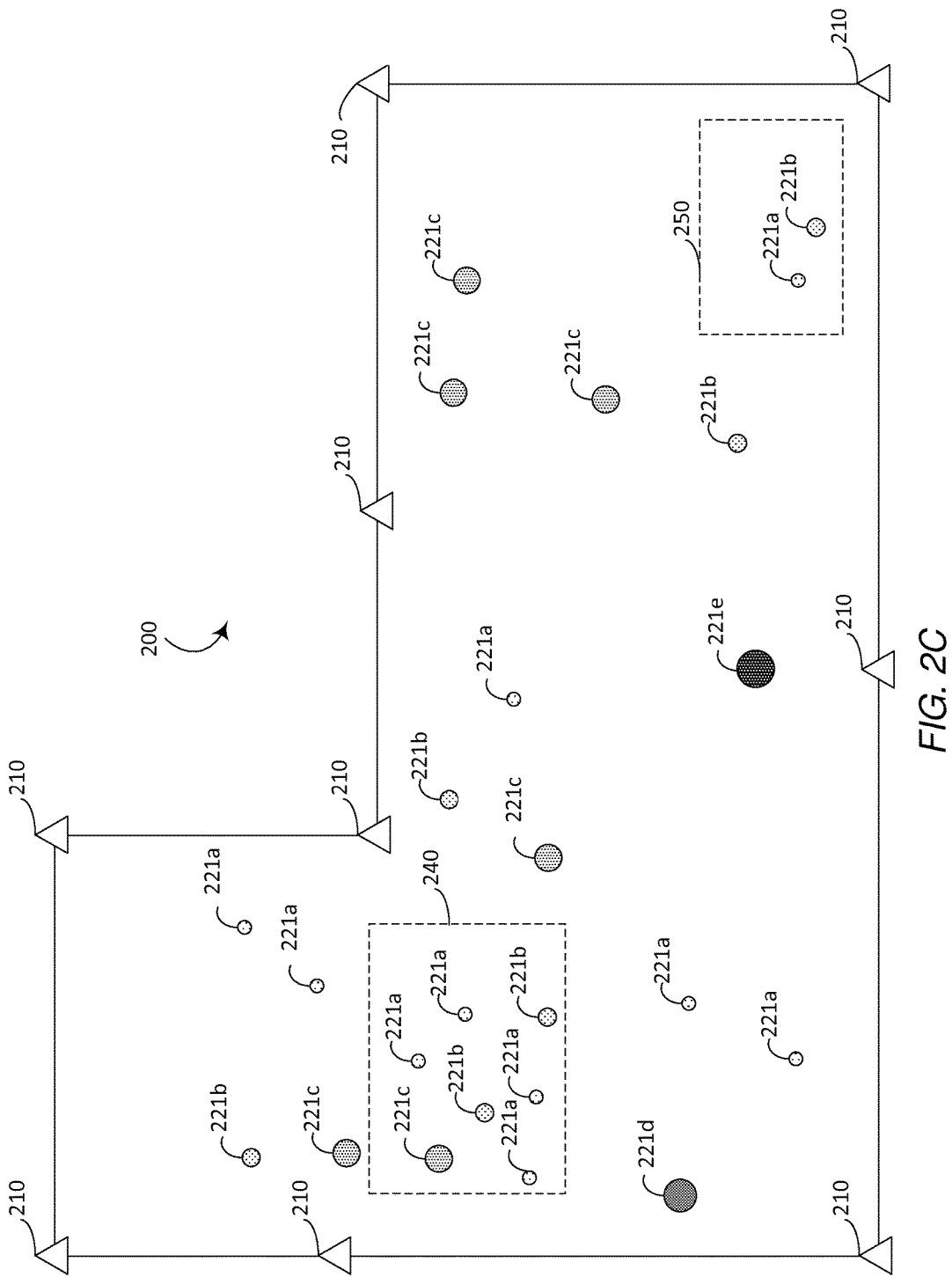
FIG. 2C is a performance diagram super-imposed on a plan view of an office layout in accordance with some implementations.

FIG. 2C is a continuation of the performance example including the office layout 200 of FIG. 2A, with corresponding access points 210, the meeting area 240 and the testing area 250. In FIG. 2C, as in FIG. 2A, for each client device 157 present in the office layout 200, a raw measure of network utilization is represented by metrics 221a, 221b, 221c, 221d and 221e. The metrics 221a, 221b, 221c, 221d and 221e respectively represent quintiles of raw network utilization from smallest or weakest performing ($1^{st}$) quintile to largest or strongest performing ($5^{th}$) quintile in increasing magnitude. The choice of quintile is for illustration purposes only. According to some implementations, a raw measure of network utilization is made in reference to a network connection between an individual client device 157 and an associated access point 210. According to some implementations, where access points 210 in combination provide an ad hoc data networking environment, a raw measure of network utilization is made in reference to a network connection between a devices 157 and an associated access point 210 that provides a performance characterization bound (e.g., a performance peak that can be achieved based on the configuration of an access point and/or client device). According to some implementations, a performance characterization bound is a function of individual device 157 performance. According to some implementations, a performance characterization bound is a function of the data networking environment. According to some implementations the metrics 221a, 221b, 221c, 221d and 221e raw measure of network utilization are bitrates associated with frames that are successfully transmitted between client devices 157 and an access point 210. However, as illustrated in FIG. 2C and in contrast to FIG. 2A, a number of client devices 157 have moved to and are clustered in meeting area 240 (whereas in FIG. 2A, the client devices 157 are more disbursed throughout the office layout 200). In turn, in FIG. 2C, meeting area 240 has become an area of network congestion because an increased concentration of client devices 157 in a particular space are accessing the same group of access points 210.

Figure 2D:
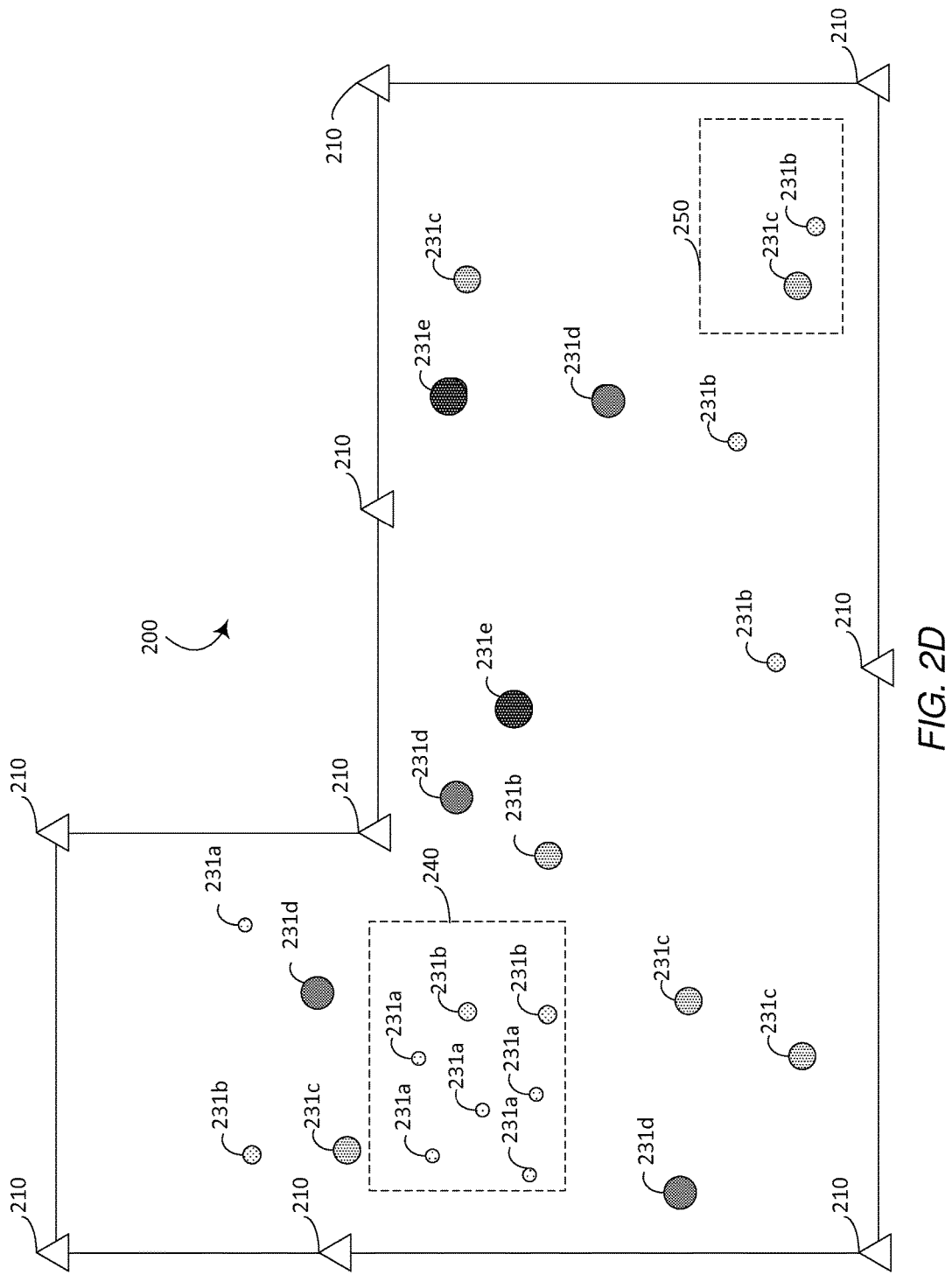
FIG. 2D is a performance diagram super-imposed on a plan view of an office layout in accordance with some implementations.

FIG. 2D is a continuation of the performance example including the office layout 200 of FIG. 2C, with corresponding access points 210, meeting area 240 and testing area 250. In FIG. 2D, contrary to FIGS. 2A and 2C, but similar to FIG. 2B, for each client device 157 present in the office layout 200, a relative measure of network utilization is represented by metrics 231a, 231b, 231c, 231d and 231e. The metrics 231a, 231b, 231c, 231d and 231e respectively represent quintiles of relative network utilization from smallest ($1^{st}$) quintile to largest ($5^{th}$) quintile in increasing magnitude. The choice of quintile is for illustration purposes only. According to some implementations, the metrics 231a, 231b, 231c, 231d and 231e are relative metrics based on a function of a raw measure of network utilization and a capacity corresponding to the access point 210 by which the network is utilized. According to some implementations, the metrics 231a, 231b, 231c, 231d and 231e are relative metrics based on a function of a raw measure of network utilization and a network resource capacity of the relevant particular client device 157. In some implementations, the metrics 231a, 231b, 231c, 231d and 231e are relative metrics based on a function of a raw measure of network utilization, and the lesser of a network resource capacity of the relevant particular client device 157 and a capacity corresponding to the access point 210 by which the network is utilized. According to the example of FIGS. 2C and 2D, meeting area 240 has become an area of congestion for network utilization. This is more apparent from FIG. 2D which illustrates the relative metrics. According to the raw metrics of FIG. 2C, 221a, 221b, 221c, 221d and 221e, client devices 157 in meeting area 240 perform adequately, as high capacity client devices 157 achieve medial performance. However, inspection of FIG. 2D reveals that relative to available capacity, client devices 157 in the meeting area 240 are underperforming because the associated metrics within the meeting area are generally in the lower quintile.

Figure 3:
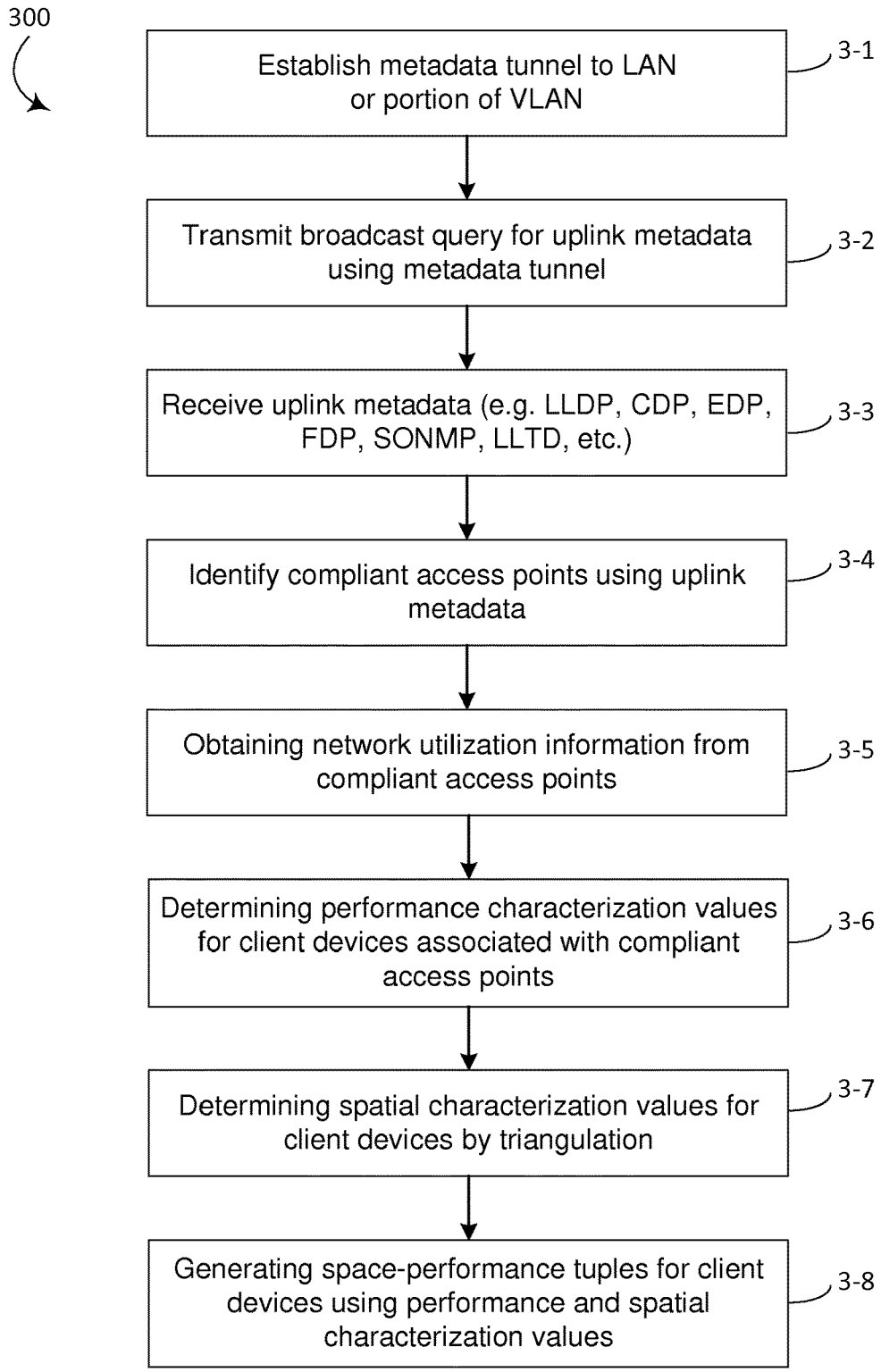
FIG. 3 is a flowchart representation of a method of generating a space-performance tuple in accordance with some implementations.

FIG. 3 is a flowchart representation of a method 300 of performance characterization in accordance with some implementations. For the sake of additional clarity and detail, the method 300 is described with reference to FIGS. 1, 2A, 2B, 2C, 2D and 14. In some implementations, the method 300 is performed by a performance characterization module 1430 operating on and/or in coordination with a server system (e.g., the cloud hosted management server 112 of FIG. 1) in order to produce performance characterizations of client devices. Additionally and/or alternatively, in some implementations, the method 300 is performed by and/or in coordination with a gateway node (e.g., gateway node 151, or a similarly situated node) of a LAN and/or a portion of a VLAN in order to produce a performance characterization of client devices that communicate through the gateway node.

Briefly, the method 300 includes obtaining network utilization information from compliant access points, determining performance characterization values for client devices associated with compliant access points, determining spatial characterization values for client devices by triangulation, and generating space-performance tuples for client devices using performance and spatial characterization values. To that end, as represented by block 3-1, the method 300 optionally includes establishing a metadata tunnel to a LAN or a portion of a VLAN. For example, with reference to FIG. 1, the cloud hosted management server 112 establishes the metadata tunnel 160 to the LAN 150. As noted above, the metadata tunnel 160 extends between the gateway 115 of the cloud hosted management system 110 and the gateway node 151 of the LAN 150, through portions of the Internet 120 and the infrastructure of the ISP 140.

As represented by block 3-2, the method 300 includes transmitting a broadcast query for uplink metadata using the metadata tunnel or from a local gateway node. For example, again with reference to FIG. 1, the cloud hosted management server 112 produces and transmits a broadcast query through the metadata tunnel 160, which is received by the gateway node 151. The gateway node 151 then broadcasts the query to all of the compliant and non-compliant access points 153, 155 in the LAN 150 through the network root node 152. In another example, when the method 300 is performed locally by and/or in coordination with a gateway node of a LAN, the gateway node 151 produces and transmits a broadcast query for uplink metadata without utilizing a metadata tunnel to a system or device external to the LAN.

As represented by block 3-3, the method 300 includes receiving uplink metadata from compliant access points (e.g., compliant access points 153) within the LAN. In other words, the method 300 includes receiving information from the networking devices within a LAN that are configured to report uplink information in response to receiving a suitable reporting request, such as the broadcast query. In various implementations, uplink information is provided in a conforming frame that includes a first device identifier of the reporting device, a port identifier of the port of the reporting device that is used for transmitting externally addressed traffic, and optionally a second device identifier of a device that is connected to the port. In various implementations, the uplink metadata from compliant devices conforms to at least one of a number of link layer discovery protocols, such as LLDP, CDP, EDP, FDP, SONMP, LLTD, etc. Non-compliant access points (e.g., non-compliant access points 155) are not configured to properly respond to a reporting request, and will often ignore the request. However, in some instances, a non-compliant device responds with an error packet that includes at least one of its own device identifier, its IP address, and its MAC address.

As represented by block 3-4, the method 300 includes identifying the compliant access points 153 within the LAN using the uplink metadata reported from the compliant access points 153. As noted above, a compliant device will respond to a reporting request with a conforming frame that includes a device ID. Accordingly, the requesting device (e.g., the cloud hosted management server 112 or the gateway node 151) is able to identify at least the normally operating compliant access points 153 within the LAN using the received uplink metadata. Moreover, those of ordinary skill in the art will appreciate from the present disclosure that, in various implementations a LAN or a portion of a VLAN includes any number of compliant access points 153 including, but not limited to, gateway devices, routers, switches, repeaters, security appliances, firewall devices, servers, wireless APs, client devices. Also, in some implementations, the requesting device is also able to identify non-compliant access points 155 from the aforementioned error packets.

As represented by block 3-5, the method 300 includes obtaining network utilization information from compliant access points 153. As understood by those of ordinary skill in the art, network utilization information includes one or more of a service level indicator value of a client device 157, access point capacity value of a corresponding compliant access point 153, a network resource capacity value for that client device 157, and a client device list of client devices 157 associated with a providing access point 153. In some implementations network utilization information includes physical layer quality information (e.g., a received signal strength indication, an estimated transmitted signal strength indication, a signal to noise ratio, and an interference indication). According to some implementations, the service level indicator value provides a quantitative indication of utilization of a network resource provided by the compliant access point to at least one of the one or more client devices. According to some implementations the quantitative indication is a function of a metric 230a, 230b, 230c, 230d or 230e. In some implementations, the network resource capacity value characterizes the capacity of a respective client device to use a first network resource provided through the compliant access point. According to some implementations, the network resource capacity value characterizes a capacity corresponding to the access point by which the network is utilized by one or more client devices. According to some implementations, the network resource capacity value characterizes the lesser of the client device capacity and the access point capacity. According to some implementations, network utilization information includes a respective client device identifier for each of one or more client devices 157 from which the compliant access point receives a corresponding signal in breach of a threshold power level.

As represented by block 3-6, the method 300 includes determining performance characterization values for client devices 157 associated with compliant access points 153. According to some implementations a performance characterization value for one client device 157 is based on a function of the service level indicator value for that client device 157 and the respective network resource capacity value for that device 157. According to some implementations, and further detailed in connection to FIG. 6, and where network resources include an upstream and downstream resource, a performance characterization value for one client device 157 is based on a function of the upstream service level indicator value for that client device 157, the respective upstream network resource capacity value for that device 157, the downstream service level indicator value for that client device 157, and the respective downstream network resource capacity value for that device 157. The function by which a performance characterization value is related to a respective service level indicator value and network resource capacity value may be fractional and/or weighted but is not limited as such. According to some implementations, however, for at least one region of interest with respect to service level indicator value and/or network resource capacity value, the performance characterization value is rising as a function of service level indicator value and falling as a function of network resource capacity value.

As represented by block 3-7, the method 300 includes determining spatial characterization values for client devices by triangulation. According to some implementations triangulation is implemented by a multilateration process—which includes measuring the time difference of arrival (TDOA) of a signal from a client device 157 at multiple compliant access points 153. In such implementations, where a signal is emitted from a client device 157, it will generally arrive at different times at two spatially separated access points 153. The TDOA is due to the different distances of each access point 153 from the client device 157. Given two access points 153 and a known TDOA, a locus of possible emitter locations is one half of a two-sheeted hyperboloid. Given a third access point 153 at a third location providing complementary TDOA measurements (versus the first and second access points 153) the client device 157 is located on a second hyperboloid. The intersection of these two hyperboloids describes a curve on which the emitter lies. A fourth access point 153, being introduced for triangulation, additional TDOA measurements are available, and the resulting intersection defines a unique point in space. It will be appreciated that, for some implementations, a topology of access points is a precursor of TDOA calculations. Further, because errors may exist in the measurement of the time of signal arrival, enhanced accuracy can be obtained with additional access point 153 multilateration. In the case of errors, the location problem can be posed as an optimization problem and solved using, for example, a least squares method or an extended Kalman filter. Additionally, the TDOA of signals to a particular access point 153 can be averaged to improve accuracy. Those of ordinary skill in the art will also appreciate that various implementations involving multilateralization employ received signal strength and/or RSSI and phase differential between two spatially separated antennae (as in beam forming) to estimate location. It will be further appreciated that incorporation of topology of the office layout may contribute either to accuracy, or to reduce the required number of access points 153.

As represented by block 3-8, the method 300 includes generating space-performance tuples for client devices using performance and spatial characterization values. According to some implementations, the space-performance tuple characterizes a client device 157 according to location and network resource performance with respect to a particular access point 153. Also, according to some implementations, the space-performance tuple characterizes client device 157 performance with respect to the most advantageous particular access point 153 with respect to the relevant network resource. According to some implementations, and detailed further in FIG. 7, the instant associated with the location and performance is also characterized in the space-performance tuple. Furthermore, multiple space-performance tuples, in some implementations, characterize multiple channels, upstream and downstream resources, and/or the performance of a client device 157 with respect to multiple access points 153.

Figure 4:
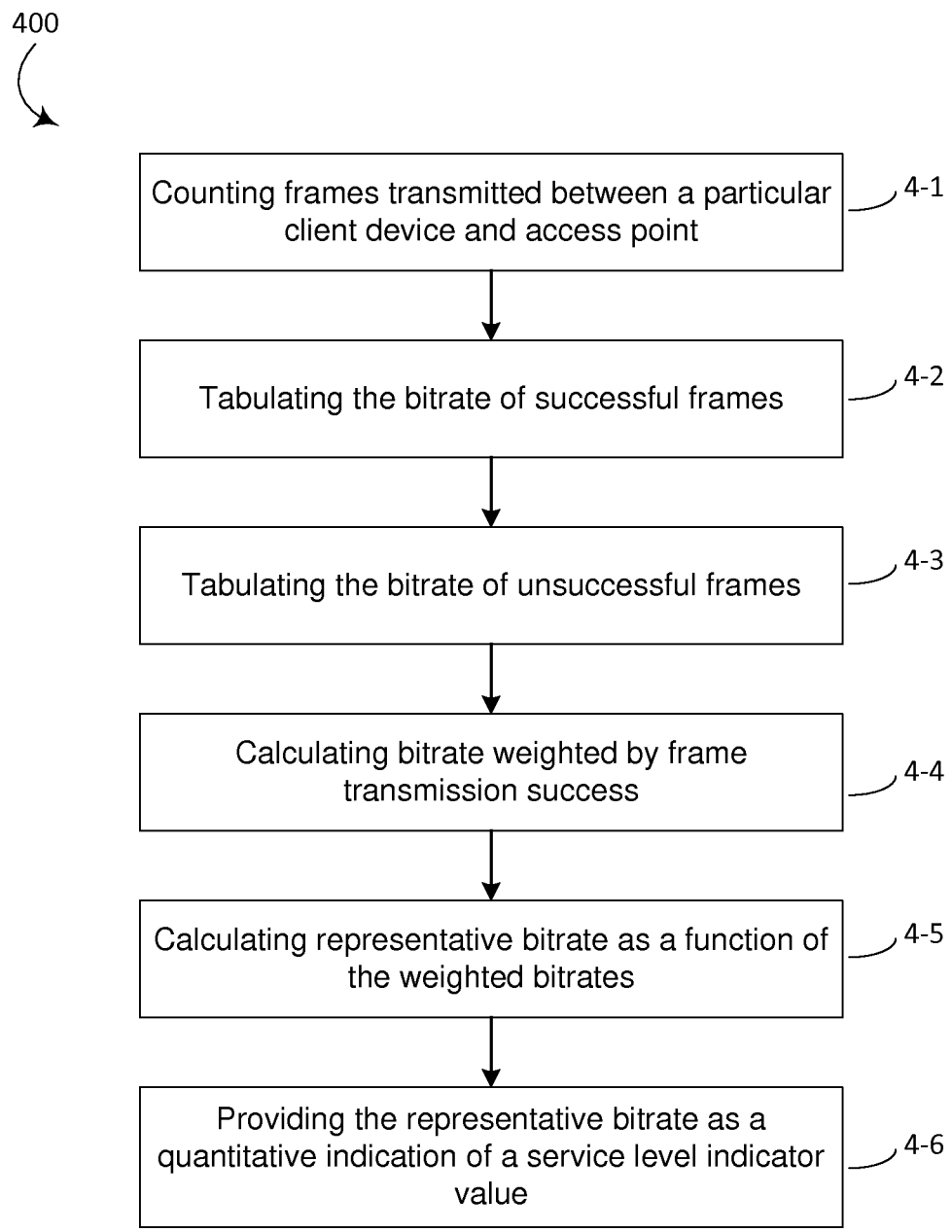
FIG. 4 is a flowchart representation of a method of providing a service level indicator value in accordance with some implementations.

FIG. 4 is a flowchart representation of a method 400 of providing a service level indicator value, discussed previously with respect to block 3-5 of FIG. 3, in accordance with some implementations. For the sake of additional clarity and detail, the method 400 is described with reference to FIGS. 1, 2A, 2B, 2C, 2D, 3 and 14. In some implementations, the method 400 is performed by a service level indicator module 1440 operating on and/or in coordination with a server system (e.g., the cloud hosted management server 112) in order to produce service level indicator value. Additionally and/or alternatively, in some implementations, the method 400 is performed by and/or in coordination with a gateway node (e.g., gateway node 151, or a similarly situated node) of a LAN and/or a portion of a VLAN in order to produce a service level indicator value of network devices that communicate through the gateway node.

Briefly, the method 400 includes counting frames transmitted between a particular client device 157 and access point 153, tabulating the bitrate of successful frames, tabulating the bitrate of unsuccessful frames, calculating bitrate weighted by frame transmission success, calculating representative bitrate as a function of the weighted bitrates, and providing the representative bitrate as a quantitative indication of a service level indicator value. To that end, as represented by block 4-1, the method 400 optionally includes counting frames transmitted between a particular client device 157 and access point 153. According to some implementations, successful frames are counted. According to some implementations, unsuccessful frames are counted. According to some further implementations, both successful and unsuccessful frames are counted. In some implementations, one of the successful and unsuccessful frames are counted, along with total frames, and the remaining one of the successful and unsuccessful frames deduced. For example, as estimate for the total number of unsuccessful frames is determined by subtracting the observed number of successful frames from the total number of successful frames observed. According to some implementations the frames are counted according to corresponding bitrate of transmission.

Figures 9, 10:
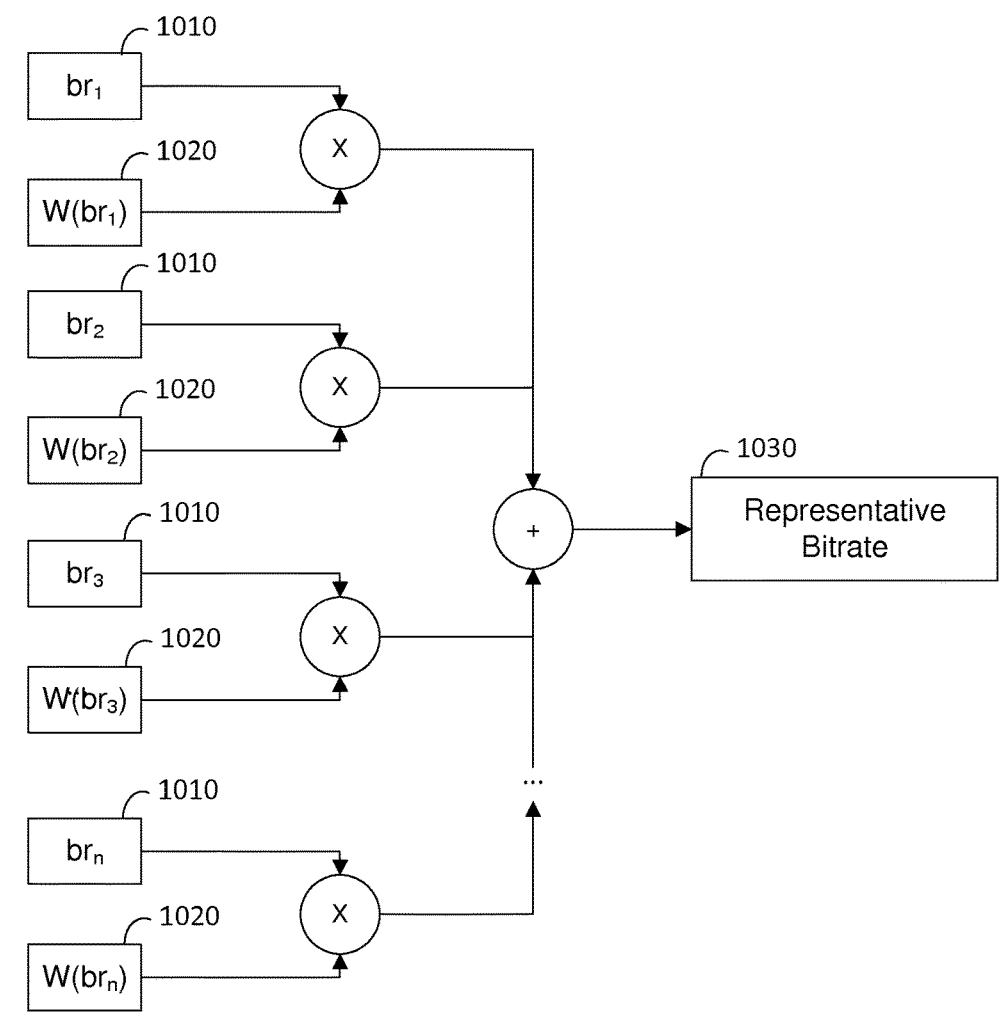
FIG. 9 is a table of frame counts in accordance with some implementations.
FIG. 10 is a diagram of a representative bitrate function in accordance with some implementations.
Figure 13:
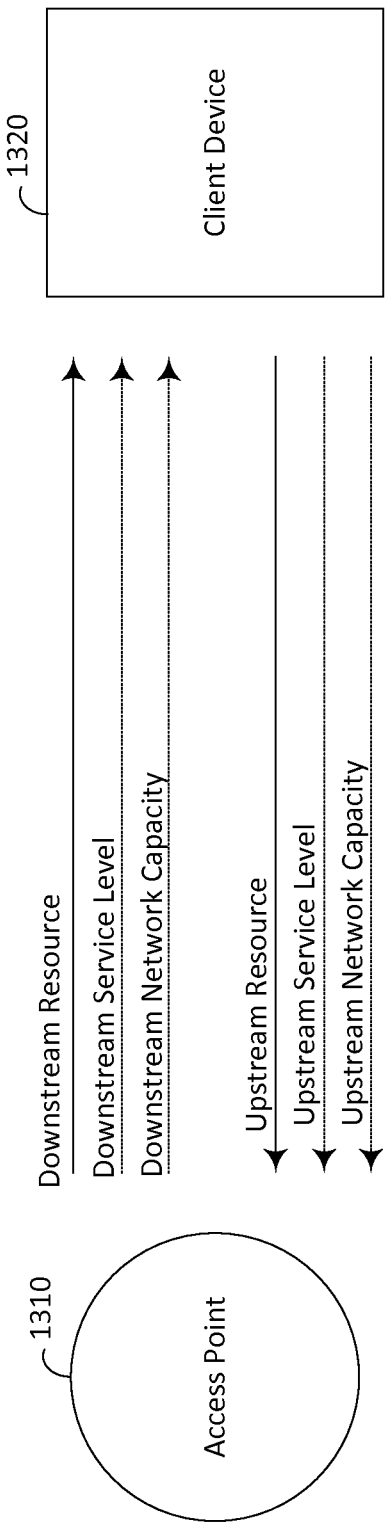
FIG. 13 is a block diagram of a client device and access point associated with methods of generating a space-performance tuple in accordance with some implementations.

As represented by block 4-2, and further referring to table 900 of FIG. 9, the method 400 includes tabulating the bitrate of successful frames. In some implementations a table 900 is maintained to record the count of successful frames determined by the portion of the method represented by block 4-1. According to some implementations, the table 900 includes a frame count corresponding to a single period during which frames are counted. According to some implementations, the table 900 includes one or more frame counts corresponding to multiple periods during which frames are counted. According to some implementations, stale frame counts are removed from the table 900. Also, according to some implementations, frame counts are tabulated according to the corresponding bitrate of transmission mentioned in reference to the portion of the method represented by block 4-1.

As represented by block 4-3, and further referring to table 900 of FIG. 9, the method 400 includes tabulating the bitrate of unsuccessful frames. In some implementations a table 900 is maintained to record the count of unsuccessful frames determined by the portion of the method represented by block 4-1. In some implementations, the table 900 includes a frame count corresponding to a single period during which frames are counted. In some implementations, the table 900 includes one or more frame counts corresponding to multiple periods during which frames are counted. In some implementations, stale frame counts are removed from the table 900. Also, in some implementations, frame counts are tabulated according to the corresponding bitrate of transmission mentioned in reference to the portion of the method represented by block 4-1.

As represented by block 4-4, and further referring to FIG. 10, the method 400 includes calculating one or more bitrates weighted by frame transmission success. In some implementations, one or more bitrates 1010 corresponding to the bitrates tabulated in portions of the method represented by blocks 4-2 and 4-3 are weighted. In some implementations the weight 1020 is a function of successful frame count. In some implementations the weight 1020 is a function of unsuccessful frame count. In some implementations the weight 1020 is a function of total frame count. In some implementations the weight 1020 is a function of two or more of successful, unsuccessful and total frame count. In some implementations, where frames are counted over multiple periods, the weight 1020 is also a function of particular period. It will be appreciated that a weight 1020 function may be a simple count, ratio of counts, mean, median, mode, or any statistical function.

As represented by block 4-5, and further referring to FIG. 10 the method 400 includes calculating representative bitrate 1030 as a function of the weighted bitrates. According to some implementations, representative bitrate is calculated as a sum of the weighted bitrates of by the portion of the method represented by block 4-4. However, it will be appreciated that other statistical functions besides summation may be appropriate. For example, some implementations include using a weighted average of bitrates in a specific time period (or also weighted geometric means), and tertiles to separate out "bad," "good," and "great" experience buckets (that can be graphically illustrated on a user interface map/topology).

As represented by block 4-6, the method 400 includes providing the representative bitrate as a quantitative indication of a service level indicator value. According to some implementations, and referring to block 3-5 of method 300, FIG. 3, network utilization information includes a service level indicator value. The service level indicator value is, according some implementations, quantified by the representative bitrate determined by the portion of the method represented by block 4-5.

Figure 5A:
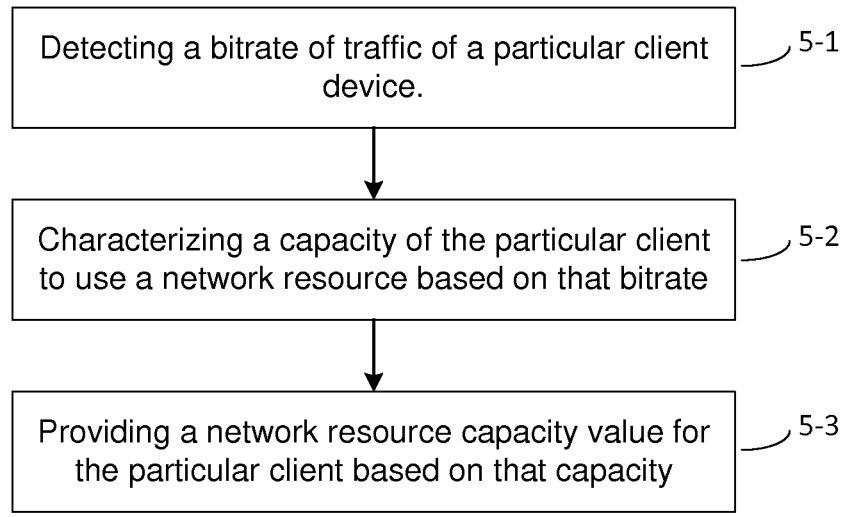
FIG. 5A is a flowchart representation of a method of providing a network capacity value in accordance with some implementations.

FIG. 5A is a flowchart representation of a method 500 of providing a network resource capacity (or capability) value, discussed previously with respect to block 3-5 of FIG. 3, in accordance with some implementations. For the sake of additional clarity and detail, the method 500 is described with reference to FIGS. 1, 2A, 2B, 2C, 2D, 3 and 11. In some implementations, the method 500 is performed by a network resource capacity module 1450 operating on and/or in coordination with a server system (e.g., the cloud hosted management server 112) in order to produce service level indicator value. Additionally and/or alternatively, in some implementations, the method 500 is performed by and/or in coordination with a gateway node (e.g., gateway node 151, or a similarly situated node) of a LAN and/or a portion of a VLAN in order to produce a service level indicator value of network devices that communicate through the gateway node.

Briefly, the method 500 includes detecting a bitrate of traffic of a particular client device 1120, characterizing a capacity of the particular client to use a network resource based on that bitrate, and providing a network resource capacity value for the particular client device 1120 based on that capacity. To that end, as represented by block 5-1, the method 500 optionally includes detecting a bitrate of a frame 1130 of traffic of a particular client device 1120. According to some implementations, at least one additional bitrate of a frame 1130 of traffic is detected. According to some implementations, where multiple bitrates are detected, more than one access point 1110 is used to detect these bitrates. According to some implementations, the detected bitrate of a frame 1130 of traffic of a particular client device 1120 is a bitrate of a successfully communicated frame. According to some implementations, the detected bitrate of a frame 1130 of traffic of a particular client device 1120 is a bitrate of a successfully communicated frame that is subsequent to an unsuccessfully communicated frame. According to some implementations, the method 500, as represented by block 5-1, includes detecting one of modulation, channel state or signal to noise ratio of a frame 1130 of traffic of a particular client device 1120. According to some implementations, the method 500, as represented by block 5-1, includes determining a count of individual error bits in a frame. According to some implementations, the method 500, as represented by block 5-1, includes detecting a combination of two or more of channel state, individual frame error bit count, bitrate, modulation and signal to noise ratio of a frame 1130 of traffic of a particular client device 1120.

As represented by block 5-2, the method 500 includes characterizing a capacity of the particular client to use a network resource based on that bitrate. According to some implementations, the capacity of the particular client to use a network resource is a function of a single detected bitrate. According to some implementations, the capacity of the particular client to use a network resource based on multiple detected bitrate. According to some implementations, the capacity of the particular client to use a network resource is a function of a peak detected bitrate amongst multiple bitrates. According to some implementations, the capacity of the particular client to use a network resource is a statistical function of multiple bitrates (e.g., mean, median, or mode). According to some implementations, the capacity of the particular client to use a network resource is a statistical function of time contiguous groupings which are in turn populated by multiple bitrates. These bitrates may in turn be statistically treated per grouping (e.g. mean, median, mode, peak). According to some implementations, the capacity of the particular client to use a network resource is a function of modulation. According to some implementations, the capacity of the particular client to use a network resource is a function of signal to noise ratio. According to some implementations, the capacity of the particular client to use a network resource is a function of two or more of channel state, individual frame error bit count, bitrate, modulation and signal to noise ratio, derived from single frames. According to some implementations, the capacity of the particular client to use a network resource is a function of two or more channel state, individual frame error bit count, bitrate, modulation and signal to noise ratio, derived from multiple frames.

As represented by block 5-3, the method 500 includes providing a network resource capacity value for the particular client based on that capacity. According to some implementations, and referring to block 3-5 of method 300, FIG. 3, network utilization information includes a network resource capacity value. This network resource capacity value is, according to these implementations, quantified by the capacity determined according to any of the implementations determined by the portion of the method represented by block 5-2. According to some implementations, the network resource capacity value is quantified by a capacity characterized as a function of the performance of an access point 1110 according to block 5-1. According to some implementations, the network resource capacity value is quantified by a capacity characterized as a function of the performance of multiple access point 1110 according to block 5-1. According to some implementations, the network resource capacity value is quantified by the lesser of (i) a capacity determined according to any of the implementations determined by the portion of the method represented by block 5-2; and (ii) a capacity characterized as a function of the performance of at least one access point 1110 according to block 5-1.

Figure 5B:
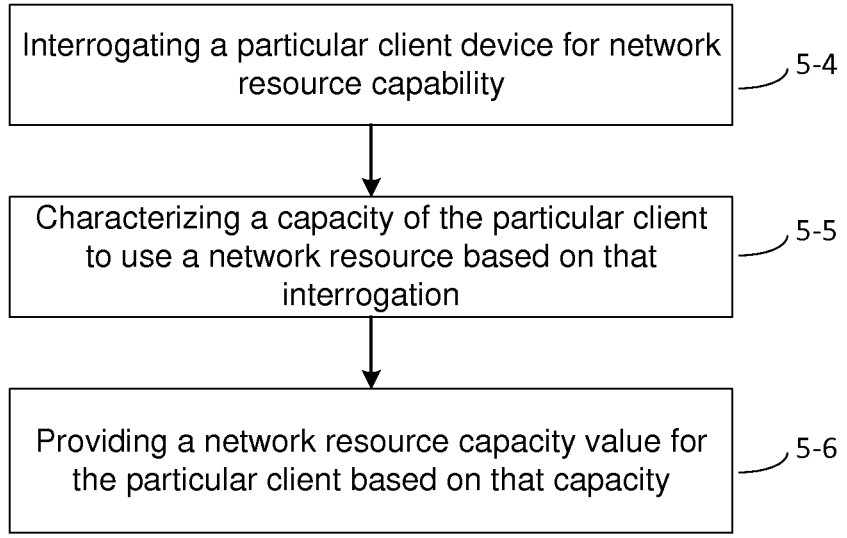
FIG. 5B is a flowchart representation of a method of providing a network capacity value in accordance with some implementations.

FIG. 5B is a flowchart representation of a method 510 of providing a network resource capacity value, discussed previously with respect to block 3-5 of FIG. 3, in accordance with some implementations. For the sake of additional clarity and detail, the method 510 is described with reference to FIGS. 1, 2A, 2B, 2C, 2D, 3, 12 and 14. In some implementations, the method 510 is performed by a network resource capacity module 1450 operating on and/or in coordination with a server system (e.g., the cloud hosted management server 112) in order to produce service level indicator value. Additionally and/or alternatively, in some implementations, the method 510 is performed by and/or in coordination with a gateway node (e.g., gateway node 151, or a similarly situated node) of a LAN and/or a portion of a VLAN in order to produce a service level indicator value of network devices that communicate through the gateway node.

Briefly, the method 510, includes interrogating a particular client device 1220 for network resource capability, characterizing a capacity of the particular client device 1220 to use a network resource based on that interrogation, and providing a network resource capacity value for the particular client device 1220 based on that capacity. To that end, as represented by block 5-4, the method 500 includes interrogating a particular client device 1220 for network resource capability. According to some implementations, an access point 1210 initiates a request for a returned interrogation value for the particular client device 1220. According to some implementations, an access point 1210 forwards a request for a returned interrogation value for the particular client device 1220. According to some implementations the client device 1220 returns a returned interrogation value directly indicating capacity. According to some implementations, the client device 1220 returns an interrogation value indicative of capacity (e.g., device model, modem model, or power state).

As represented by block 5-5, the method 510 includes characterizing a capacity of the particular client to use a network resource based on that interrogation. According to some implementations, the capacity of the particular client to use a network resource is a function of a returned interrogation value.

As represented by block 5-6, the method 510 includes providing a network resource capacity value for the particular client based on that capacity. According to some implementations, and referring to block 3-5 of method 300, FIG. 3, network utilization information includes a network resource capacity value. This network resource capacity value is, according to these implementations, quantified by the capacity determined by the portion of the method represented by block 5-5.

Figure 6:
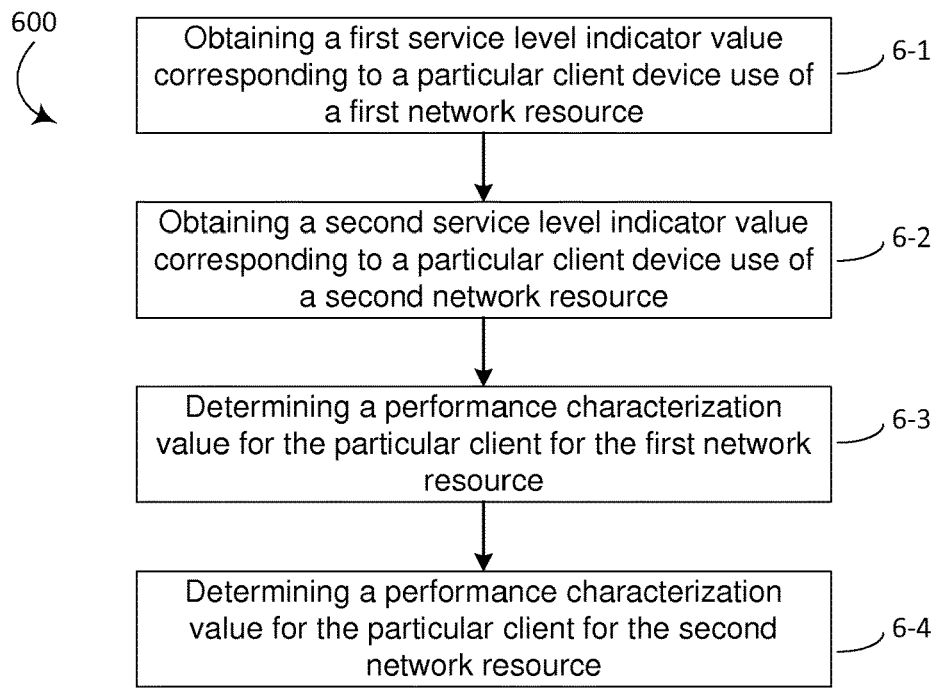
FIG. 6 is a flowchart representation of a method of determining a performance value in accordance with some implementations.

FIG. 6 is a flowchart representation of a method 600 of providing performance characterization values for multiple network resources, discussed previously with respect to block 3-6 of FIG. 3, in accordance with some implementations. For the sake of additional clarity and detail, the method 600 is described with reference to FIGS. 1, 2A, 2B, 2C, 2D, 3, 13, and 14. In some implementations, the method 600 is performed by a performance characterization module 1430 operating on and/or in coordination with a server system (e.g., the cloud hosted management server 112) in order to produce a performance characterization value. Additionally and/or alternatively, in some implementations, the method 600 is performed by and/or in coordination with a gateway node (e.g., gateway node 151, or a similarly situated node) of a LAN and/or a portion of a VLAN in order to produce a service level indicator value of network devices that communicate through the gateway node.

Briefly, the method 600 includes obtaining a first service level indicator value corresponding to use of a first network resource by a particular client device, obtaining a second service level indicator value corresponding to use of a second network resource by the particular client device, determining a first performance characterization value for the particular client associated with the first network resource and determining a second performance characterization value for the particular client associated with the second network resource.

To that end, as represented by block 6-1, the method 600 includes obtaining a first service level indicator value corresponding to a particular client device use of a first network resource. According to some implementations, the first service level indicator value provides a quantitative indication of utilization of a first network resource provided by the compliant access point 1310 to at least one of the one or more client devices 1320. According to some implementations the quantitative indication is a function of a raw metric. According to some implementations the quantitative indication is a representative bitrate. According to some implementations that quantitative indication is calculated as a sum of the weighted bitrates. According to some implementations the quantitative indication weighting is a function of one or more of total, successful or unsuccessful frame count. According to some implementations one or more of total, successful or unsuccessful frame count are tabulated in order to derive weighting statistics. According to some implementations the first network resource is an upstream channel.

As represented by block 6-2, the method 600 includes obtaining a second service level indicator value corresponding to a particular client device use of a second network resource. According to some implementations, the second service level indicator value provides a quantitative indication of utilization of a second network resource provided by the compliant access point 1310 to at least one of the one or more client devices 1320. According to some implementations the quantitative indication is a function of a raw metric. According to some implementations the quantitative indication is a representative bitrate. According to some implementations that quantitative indication is calculated as a sum of the weighted bitrates. According to some implementations the quantitative indication weighting is a function of one or more of total, successful or unsuccessful frame count. According to some implementations one or more of total, successful or unsuccessful frame count are tabulated in order to derive weighting statistics. According to some implementations the first network resource is a downstream channel.

As represented by block 6-3, the method 600 includes determining a first performance characterization value for the particular client for the first network resource. According to some implementations a first performance characterization value for one client device 1320 is based on a function of the first service level indicator value for that client device 1320, the respective first network resource capacity value for that device 1320, the second service level indicator value for that client device 1320, and the second network resource capacity value for that device 1320. According to some implementations a first performance characterization value for one client device 1320 is based on a function of the first service level indicator value for that client device 1320 and the second service level indicator value for that client device 1320. According to some implementations a first performance characterization value for one client device 1320 is based on the lesser of: (i) a function of the first service level indicator value for that client device 1320 and the second service level indicator value for that client device 1320; and, (ii) the respective first network resource capacity value for that device 1320.

As represented by block 6-4, the method 600 includes determining a performance characterization value for the particular client for the second network resource. According to some implementations a second performance characterization value for one client device 1320 is based on a function of the first service level indicator value for that client device 157, the respective first network resource capacity value for that device 1320, the second service level indicator value for that client device 1320, and the second network resource capacity value for that device 1320. According to some implementations a second performance characterization value for one client device 1320 is based on a function of the first service level indicator value for that client device 1320 and the second service level indicator value for that client device 1320. According to some implementations a second performance characterization value for one client device 1320 is based on the lesser of: (i) a function of the first service level indicator value for that client device 1320 and the second service level indicator value for that client device 1320; and, (ii) the respective second network resource capacity value for that device 1320.

According to some implementations functions of the first service level indicator value for that client device 1320 and the second service level indicator value for that client device 1320 are averages. According to some implementations functions of the first service level indicator value for that client device 1320 and the second service level indicator value for that client device 1320 are weighted averages. According to some implementations the first and second performance characterization values of method 600 are upstream and downstream characterization values.

Figure 7:
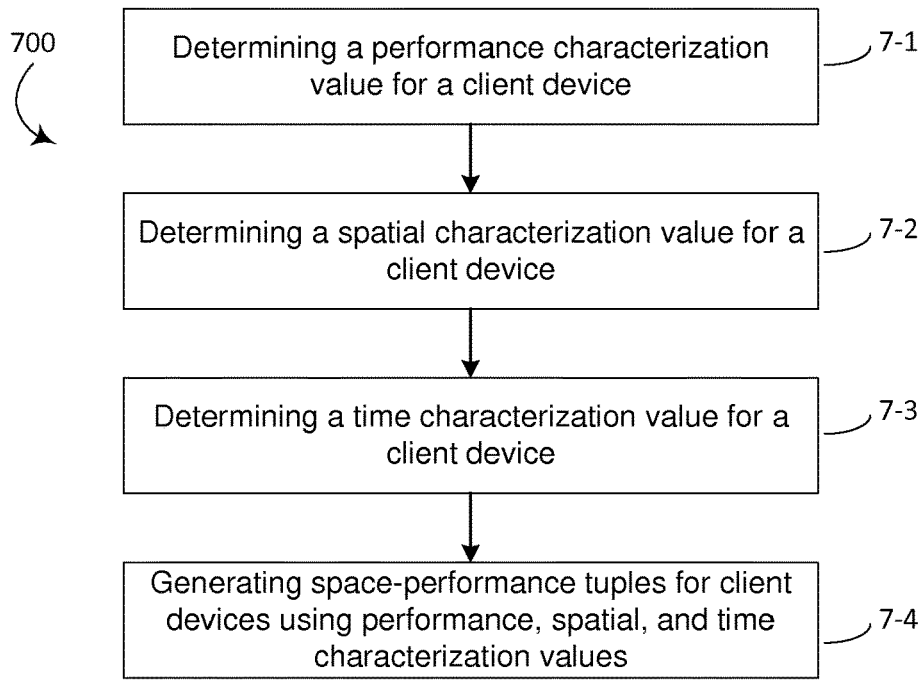
FIG. 7 is a flowchart representation of a method of generating a spatial-performance tuple in accordance with some implementations.

FIG. 7 is a flowchart representation of a method 700 of generating space-performance tuples for client devices using performance, spatial, and time characterization values, discussed previously with respect to block 3-8 of FIG. 3, in accordance with some implementations. For the sake of additional clarity and detail, the method 700 is described with reference to FIGS. 1, 2A, 2B, 2C, 2D, 3 and 14. In some implementations, the method 700 is performed by a tuple generation module 1420 operating on and/or in coordination with a server system (e.g., the cloud hosted management server 112) in order to produce a space-performance tuple. Additionally and/or alternatively, in some implementations, the method 700 is performed by and/or in coordination with a gateway node (e.g., gateway node 151, or a similarly situated node) of a LAN and/or a portion of a VLAN in order to produce a service level indicator value of network devices that communicate through the gateway node.

Briefly, the method 700 includes determining a performance characterization value for a client device, determining a spatial characterization value for a client device, determining a time characterization value for a client device, and generating space-performance tuples for client devices using performance, spatial, and time characterization values. To that end, as represented by block 7-1, the method 700 includes determining a performance characterization value for a client device. According to some implementations a performance characterization value for one client device 157 is based on a function of the service level indicator value for that client device 157 and the respective network resource capacity value for that device 157. According to some implementations, and further detailed in connection to FIG. 6, and where network resources include an upstream and downstream resource, a performance characterization value for one client device 157 is based on a function of the upstream service level indicator value for that client device 157, the respective upstream network resource capacity value for that device 157, the downstream service level indicator value for that client device 157, and the respective downstream network resource capacity value for that device 157. According to some implementations a performance characterization value for one client device 157 is based on a function of the first service level indicator value for that client device 157 and the second service level indicator value for that client device 157. According to some implementations a performance characterization value for one client device 157 is based on the lesser of: (i) a function of the first service level indicator value for that client device 157; and, the second service level indicator value for that client device 157 and (ii) the respective first network resource capacity value for that device 157. According to some implementations a performance characterization value for one client device 157 is based on the lesser of: (i) the first service level indicator value for that client device 157; and, (ii) the respective first network resource capacity value for that device 157. According to some implementations, the function by which a performance characterization value is related to a respective service level indicator value and network resource capacity value may be fractional but is not limited as such. According to some implementations, however, for at least one region of interest with respect to service level indicator value and/or network resource capacity value, the performance characterization value is rising as a function of service level indicator value and falling as a function of network resource capacity value. According to some implementations, a service level indicator value is a raw metric. According to some implementations, a service level indicator value is a representative bitrate. According to some implementations, a representative bitrate is a weighted sum of one or more of total, unsuccessful and successful frame counts.

As represented by block 7-2, the method 700 includes determining a spatial characterization value for a client device. According to some implementations this function is implemented by multilateration—E.g., by measuring the time difference of arrival (TDOA) of a signal from a client device 157 at multiple compliant access points 153. In these implementations, where a signal is emitted from a client device 157, it will generally arrive at different times at two spatially separated access points 153. The TDOA is due to the different distances of each access point 153 from the client device 157. Given two access points 153 and a known TDOA, a locus of possible emitter locations is one half of a two-sheeted hyperboloid. Given a third access point 153 at a third location providing complementary TDOA measurements (versus the first and second access points 153) the client device 157 is located on a second hyperboloid. The intersection of these two hyperboloids describes a curve on which the emitter lies. A fourth access point 153, being introduced for triangulation, additional TDOA measurements are available, and the resulting intersection defines a unique point in space. It will be appreciated that, for some implementations, a topology of access points is a precursor of TDOA calculations. Further, because errors may exist in the measurement of the time of signal arrival, enhanced accuracy can be obtained with additional access point 153 multilateration. In the case of errors, the location problem can be posed as an optimization problem and solved using, for example, a least squares method or an extended Kalman filter. Additionally, the TDOA of signals to a particular access point 153 can be averaged to improve accuracy. It will be further appreciated that incorporation of topology of the office layout may contribute either to accuracy, or to reduce the required number of access points 153.

As represented by block 7-3, the method 700 includes determining a time characterization value for a client device. According to some implementations a time characterization value is generated according an access point 153 clock. According to some implementations a time characterization value is generated when the service level indicator value is generated. According to some implementations a time characterization value is generated when metrics used in the generation of a service level indicator value are collected. According to some implementations a time characterization value is generated when the performance characterization value is generated. According to still other implementations a time characterization value is generated when the spatial characterization value is generated. According to some implementations a time characterization value is generated between two of: the time when the service level indicator value is generated; the time when metrics used in the generation of a service level indicator value are collected; the time when the performance characterization value is generated; and, the time when the spatial characterization value is generated.

As represented by block 7-4, the method 700 includes generating space-performance tuples for client devices using performance, spatial, and time characterization values. According to some implementations, the space-performance tuple characterizes a client device 157 according to location and network resource performance with respect to a particular access point 153. Also, according to some implementations, the space-performance tuple characterizes client device 157 performance with respect to the most advantageous particular access point 153 with respect to the relevant network resource. According to some implementations, the space-performance tuple characterizes a client device 157 according to time, location and network resource performance with respect to a particular access point 153. Furthermore, multiple space-performance tuples may, in some implementations, may characterize multiple channels, upstream and downstream resources, and/or the performance of a client device 157 with respect to multiple access points 153. According to some implementations, time information of a space-performance tuples is calculated based on the time characterization determined by the portion of the method represented by block 7-3. According to some implementations, location information of a space-performance tuples is calculated based on the spatial characterization value determined by the portion of the method represented by block 7-2. According to some implementations, network resource performance information of a space-performance tuples is calculated based on the performance characterization value determined by the portion of the method represented by block 7-1.

Figure 8:
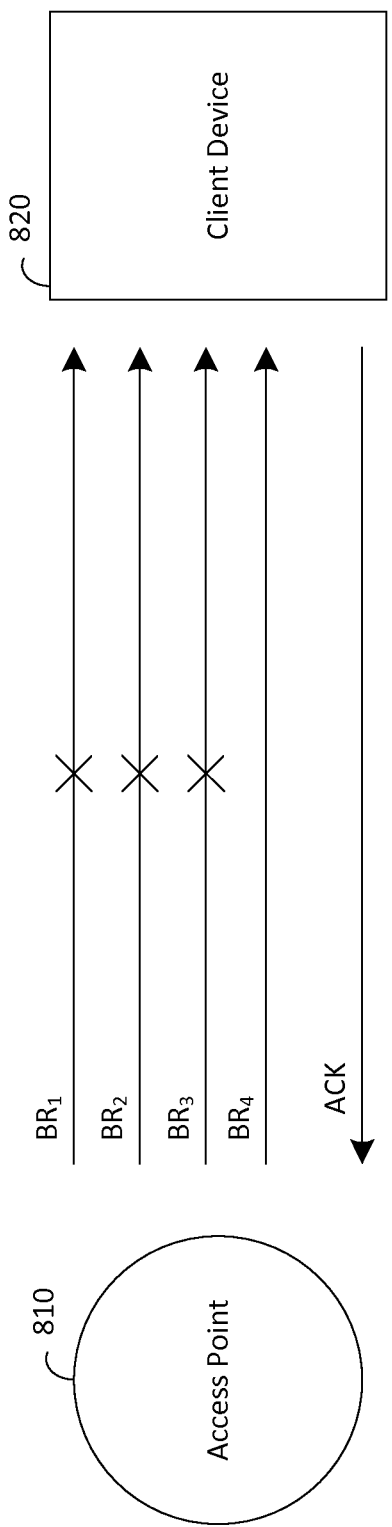
FIG. 8 is a block diagram of the pairing of an access point and client device in accordance with some implementations.

FIG. 8 is a block diagram of a pairing access point 810 and client device 820. According to one implementation, access point 810 will attempt to connect to client device 820 with the best bitrate $BR_1$. Where there is an unsuccessful connection, there is no acknowledgement, and the access point 810 will attempt to connect to client device 820 with the next best bitrate $BR_2$. This procedure will be iterated until the client device 820 acknowledges. According to one implementation, the access point 810 can increase power for any iteration until it reaches maximum power.

Figure 14:
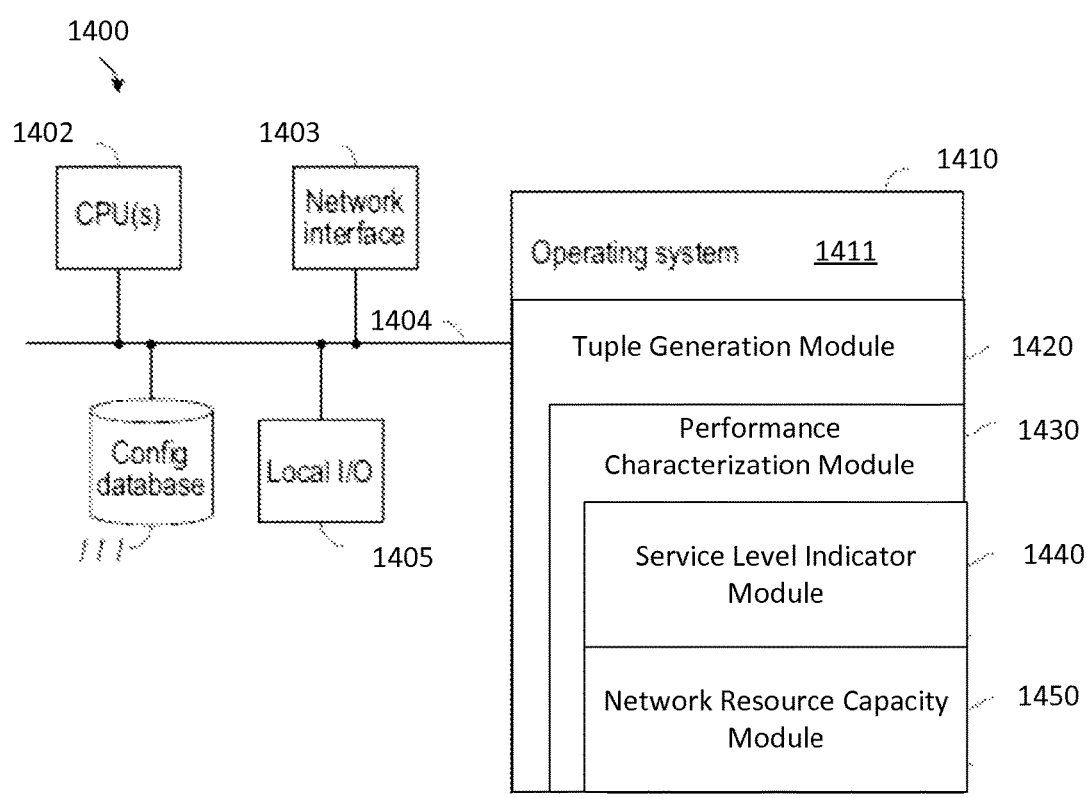
FIG. 14 is a block diagram of an example of a network resource management system 1400 in accordance with some implementations.

FIG. 14 is a block diagram of an example of a network resource management system 1400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network resource management system 1400 includes one or more processing units (CPU's) 1402, the configuration database 111, a network interface 1403, a memory 1410, a local I/O interface 1405, and one or more communication buses 1404 for interconnecting these and various other components.

In some implementations, the communication buses 1404 include circuitry that interconnects and controls communications between system components. The memory 1410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1410 optionally includes one or more storage devices remotely located from the CPU(s) 1402. The memory 1410 comprises a non-transitory computer readable storage medium. In some implementations, the memory 1410 or the non-transitory computer readable storage medium of the memory 1410 stores the following programs, modules and data structures, or a subset thereof including an optional operating system 1411 and a tuple generation module 1420.

The operating system 1411 includes procedures for handling various basic system services and for performing hardware dependent tasks.

In some implementations, the tuple generation module 1420 generates space-performance tuples for client devices using performance and spatial characterization values. In some implementations, the tuple generation module 1420 comprises a performance characterization module 1430 for determining performance characterization values for client devices associated with compliant access points. In some implementations, the performance characterization module 1430 comprises one or both of a service level indicator module 1440 and network resource capacity module 1450 for providing a representative bitrate as a quantitative indication of a service level indicator value, and providing a network resource capacity value for the particular client based on a characterized capacity, respectively.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of each are renamed consistently.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   obtaining network utilization information from a compliant access point, wherein the network utilization information includes a respective first service level indicator value characterizing utilization of a network resource provided through the compliant access point by at least one of one or more client devices, wherein the at least one respective first service level indicator value is determined as a function of a representative bitrate used to successfully transmit one or more frames between the compliant access point and a particular client device, wherein the representative bitrate is determined as a weighted average of one or more bitrates of the one or more frames successfully transmitted;
   obtaining network capacity information from the compliant access point, wherein the network capacity information includes a respective first network resource capacity value characterization the capacity of utilization of the network resource provided through the compliant access point by the at least one of the one or more client devices; and
   determining a respective first performance characterization value for the at least one of the one or more client devices based on a function of the respective first service level indicator value and the respective first network resource capacity value.

2. The method of claim 1, further comprising:
   obtaining the respective first network resource capacity value for the at least one of the one or more client devices from one or more communications between the compliant access point and the at least one of the one or more client devices.

3. The method of claim 1, wherein the network utilization information includes a respective second service level indicator value for the at least one of one or more client devices.

4. The method of claim 3, further comprising:
   determining a respective second performance characterization value for the at least one of the one or more client devices based on a function of the respective second service level indicator value and at least one of a second access point capacity value and a respective second network resource capacity value for the at least one of the one or more client devices, wherein the respective first performance characterization value is further based on the respective second service level indicator value.

5. The method of claim 1, further comprising:
determining said quantitative indication as a function of physical layer quality information, wherein said physical layer quality information is at least one of a received signal strength indication, an estimated transmitted signal strength indication, a signal to noise ratio, and an interference indication.

6. A method comprising:
obtaining network utilization information from a plurality of compliant access points, wherein the network utilization information includes a respective client device identifier for each of one or more client devices from which the compliant access point receives a corresponding signal in breach of a threshold level, a respective first service level indicator value for each of the at least one or more client devices, and a respective first client device capability value for each of the at least one or more client devices, wherein each respective first client device capability value characterizes the capacity of a respective client device to use a first network resource provided through the compliant access point;
determining a respective first performance characterization value for each of the one or more client devices based on a function of the respective first service level indicator value and the respective first client device capability value;
determining a respective spatial characterization value for each of the one or more client devices using said network utilization information reported from the plurality of compliant access points; and
generating a respective first space-performance tuple for each of the one or more client devices using said respective first performance characterization value and said respective spatial characterization value.

7. The method of claim 6, wherein each respective first service level indicator value provides a quantitative indication of utilization of a network resource provided by the plurality of compliant access points to the respective at least one of the one or more client devices.

8. The method of claim 7, wherein at least one respective first service level indicator value is determined as a function of a representative bitrate used to successfully transmit one or more frames between a particular compliant access point and a particular client device.

9. The method of claim 8, wherein said representative bitrate is determined as a function of corresponding one or more bitrates of the one or more frames successfully transmitted, wherein said representative bitrate is determined as a weighted average of said corresponding one or more bitrates.

10. The method of claim 6, wherein each respective first network resource capacity value characterizes a capacity of the corresponding at least one or more client devices to use the first network resource provided through the plurality of compliant access points, wherein characterizing said capacity includes detecting a bitrate of traffic delivered to a particular client device.

11. The method of claim 6, further comprising determining a time characterization value for each of the at least one or more client devices using said network utilization information; and wherein said generating a respective first space-performance tuple further uses said respective time characterization value.

12. The method of claim 6, wherein the network utilization information further includes a respective second service level indicator value for each of the at least one or more client devices, and a respective second client device capability value for each of the at least one or more client devices, wherein each respective second client device capability value characterizes the capacity of a client device to use a second network resource provided through the plurality of compliant access points.

13. The method of claim 12, further comprising:
determining a respective second performance characterization value for each of the one or more client devices based on a function of the respective second service level indicator value and the respective second client device capability value; and
generating a respective second space-performance tuple for each of the one or more client devices using said respective second performance characterization value and said respective spatial characterization value.

14. The method of claim 6, further comprising:
determining said quantitative indication as a function of physical layer quality information, wherein said physical layer quality information is at least one of a received signal strength indication, an estimated transmitted signal strength indication, a signal to noise ratio, and an interference indication.

15. A device comprising:
a network interface configured to obtain network utilization information from a compliant access point, wherein the network utilization information includes a respective first service level indicator value characterizing utilization of a network resource provided through the compliant access point by at least one of one or more client devices, wherein the at least one respective first service level indicator value is determined as a function of a representative bitrate used to successfully transmit one or more frames between the compliant access point and a particular client device, wherein the representative bitrate is determined as a weighted average of one or more bitrates of the one or more frames successfully transmitted,
wherein the network interface is further configured to obtain network capacity information from the compliant access point, wherein the network capacity information includes a respective first network resource capacity value characterization the capacity of utilization of the network resource provided through the compliant access point by the at least one of the one or more client devices; and
a performance characterization module configured to determine a respective first performance characterization value for the at least one of the one or more client devices based on a function of the respective first service level indicator value and the respective first network resource capacity value.

16. The device of claim 15, wherein the network interface is configured to obtaining the respective first network resource capacity value for the at least one of the one or more client devices from one or more communications between the compliant access point and the at least one of the one or more client devices.

17. The device of claim 15, wherein the network utilization information includes a respective second service level indicator value for the at least one of one or more client devices.

18. The device of claim 17, wherein the performance characterization module is further configured to determine a respective second performance characterization value for the at least one of the one or more client devices based on a function of the respective second service level indicator value and at least one of a second access point capacity value and a respective second network resource capacity value for the at least one of the one or more client devices, wherein the respective first performance characterization value is further based on the respective second service level indicator value.

* * * * *